United States Patent Office 3,414,534
Patented Dec. 3, 1968

3,414,534
ADHESIVE COMPOSITIONS COMPRISING VINYL CHLORIDE POLYMER, POLYMERIZABLE MATERIAL AND LEAD CONTAINING STABILIZER
John Jackson Huitson, Banstead, and George Colin William Randall, Sutton, England, assignors to The Distillers Company Limited, Edinburgh, Scotland, a British company
No Drawing. Continuation-in-part of application Ser. No. 258,597, Feb. 14, 1963. This application Aug. 23, 1965, Ser. No. 481,911
Claims priority, application Great Britain, Mar. 10, 1962, 9,313/62; Aug. 22, 1962, 32,161/62
5 Claims. (Cl. 260—31.6)

ABSTRACT OF THE DISCLOSURE

An adhesive vinyl polymer composition comprising a vinyl chloride polymer, a stabilizer which is selected from basic lead carbonate, di-basic lead phosphite, tri-basic lead sulphate or the lead salts of an organic acid containing less than 10 carbon atoms per molecule; a polymerization catalyst which acts as a free radical initiator, and as the sole polymerizable organic compound certain specified allyl compounds such as triallyl phosphate.

---

The present invention relates to adhesive compositions and in particular to such compositions containing a vinyl chloride polymer and is a continuation-in-part of our application Ser. No. 258,597 (filed Feb. 14, 1963, now abandoned).

By vinyl chloride polymer is meant throughout this specification a polymer or copolymer containing a major proportion by weight of polymerised vinyl chloride units.

A process is known from British patent specification No. 804,496 for the preparation of a thermosetting composition which is readily pourable in the cold and is subsequently cured by heating to form the thermoset composition, the thermosetting composition being prepared by mixing a paste-forming vinyl chloride homopolymer, an allyl ester monomer containing at least two ethenoid groups, a non-polymerisable ester plasticiser, a polymerisation catalyst for the allyl ester monomer and lead stearate as a stabiliser for the paste-forming vinyl chloride homopolymer. Plastisol compositions containing dispersions of finely divided vinyl chloride resin suspended in polyethylene glycol dimethacrylate esters as liquid plasticisers are also known from U.S. patent specification No. 2,618,621 (Burt). This latter specification specifically excludes the use of diacrylate esters since it is stated that such materials solvate the vinyl chloride resin.

It has now been found that novel vinyl chloride polymer compositions can be prepared having adhesive properties, such properties being conferred by selection of the heat stabiliser employed to stabilise the vinyl chloride polymer. By suitable choice of the heat stabiliser the adhesive power of the cured composition is sufficiently high for it to be used as the basis of an adhesive composition or a coating composition which adheres strongly when cured to the substrate being coated.

Accordingly, the present invention is a vinyl polymer composition which comprises a resin component consisting essentially of a vinyl chloride polymer, from about 0.01 to about 40 parts by weight of a stabiliser which is a lead salt of an acid, said acid being selected from the group consisting of inorganic acids and organic acids containing less than 10 carbon atoms per molecule, a chemical polymerisation catalyst, and as the sole polymerisable organic compound present in the composition, a compound selected from the group consisting of triethylene glycol bis (allyl carbonate), triallyl phosphate, triallyl cyanurate, diallyl phthalate, allyl acrylate and a multiple ester of maleic acid obtained by reacting together 3 molar proportions of maleic acid, 2 molar proportions of ethylene glycol and 2 molar proportions of allyl alcohol.

A polymer composition in accordance with the invention may be, for example, a powdered polymer composition wherein the polymerisable organic compound is absorbed on the vinyl chloride polymer in powder from and in admixture with the stabiliser. In this form the composition may be suitable for application to a heated substrate, on the surface of which it may be cured as an adherent film. Again the composition may be in the form of a plastisol, which may similarly be employed for coating a substrate; alternatively the composition may be prepared in the form of an organosol, in which is present a non-polymerisable, volatile liquid solvent or diluent.

Any type of suspension-, emulsion- or paste-forming vinyl chloride polymer may be employed, although in the production of plastisols and organosols it may be preferred to employ vinyl chloride polymers of the paste-forming type either alone or together with another powder-form vinyl chloride polymer. For powdered polymer compositions according to the invention, a suspension grade of vinyl chloride polymer is particularly suitable.

It should be understood that included within the scope of polymerisable organic compounds are low molecular weight polymers such as prepolymers of diallylphthalate.

The particular polymerisable organic compound selected for use in a composition according to the invention will depend in part upon the substrate to which the composition is to be applied. Thus, it is found that a blend of the multiple maleate ester referred to above and diallyl phthalate can be used to produce a composition having higher bond strengths to steel than are obtained when using diallyl phthalate alone.

As chemical polymerisation catalysts there may be used any material which will act as a free radical initiator e.g. organic peroxides such as benzoyl peroxide or di-tertiary butyl perbenzoate.

The stabilisers chosen for use in the novel compositions of the present invention are those which do not remove the adhesive properties of the composition. Such stabilisers are carefully selected because it has been found surprisingly that a number of commonly used stabilisers such as barium/cadmium laurate or lead stearate seriously impair or completely remove the adhesive properties of the plastisol compositions. Other stabilisers such as some organo-tin compounds may interfere with the polymerisation reaction and so impair the adhesive properties of the composition. In general it can be seen from the following examples that the adhesive compositions according to the present invention have a bond strength tested in shear of not less than 350 lbs./sq. in. and preferably not less than 800 lbs./sq. in. Suitable for incorporation into the novel compositions of the present invention are lead acetate, basic lead acetate, dibasic lead phthalate, basic lead carbonate, dibasic lead phosphite ($2PbO \cdot PbHPO_3 \cdot \frac{1}{2}H_2O$), tribasic lead sulphate ($3PbO \cdot PbSO_4 \cdot H_2O$), and tribasic lead maleate monohydrate, i.e.

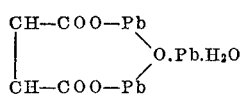

Especially preferred stabilisers are basic lead carbonate, and dibasic lead phthalate.

In addition, the compositions according to the present invention may contain a non-polymerisable plasticiser for the vinyl chloride polymer.

As a result of their adhesive properties the compositions of the invention form the basis of valuable adhesives and coating compositions. The compositions can be employed directly as adhesives but it is often economically advantageous to incorporate fillers such as whiting, blanc fixe and silicate fillers. Such fillers may also be used to control the viscosity characteristics of adhesives prepared from plastisol compositions. For example, where the adhesive may be required to have gap-filling as well as adhesive properties, thixotropic properties are desirable. This may be achieved by using the silicate fillers.

The volatile liquid in organosol compositions according to the present invention may consist of one or more volatile components. Examples of suitable liquids are hydrocarbons, esters and ketones. The organosols are primarily used as surface-coating compositions, when other ingredients commonly present in surface-coating compositions can be present. Typical of such ingredients are pigments, fillers and ultraviolet light stabilisers.

The compositions according to the present invention, or adhesive or coating compositions based thereon may be prepared by roughly mixing all the components and then passing them through suitable mills. The various components may be added in any order. In order to prolong the shelf life of such compositions any polymerisation catalyst employed can be omitted from the mixture and then added prior to use. Efficient dispersion of the catalyst can be ensured by adding it with a proportion of one of the liquid ingredients of the composition which has been retained for this purpose.

The relative proportions of the various ingredients of compositions according to the present invention can be varied widely. Preferably the vinyl chloride polymer and the unsaturated compounds present therein form at least 30% by weight of the composition. Suitable proportions by weight, expressed as a percentage of the composition are:

Paste-forming vinyl chloride polymer _____ 15 to 85
Polymerisable organic compound _____ 0.1 to 80
Polymerisation catalyst _____ 0.0 to 8
Stabiliser _____ 0.01 to 40
Non-polymerisable plasticiser _____ 0 to 50

Organosols can have the same proportions of ingredients and additionally they contain a volatile liquid.

When a plastisol composition is to be formed into an adhesive it may contain from 0% to 50% of filler; similarly a powder composition for use as a coating may contain 0% to 50% of filler.

When an organosol is to be formed into a surface coating composition it may contain from 0% to 70% by weight of pigment based on the total weight of all components other than the volatile organic liquid and up to 85% by weight of volatile liquid, based on the total weight of the organosol.

The adhesives and coating compositions based on the compositions of the present invention have the particular advantage that rigorous cleaning or degreasing of the substrate to be bonded or coated is not necessary to achieve good results.

The compositions according to the present invention, whether in the form of adhesives or coating compositions are finally brought into a cured state by the action of heat. The temperature to which they are subjected can be varied widely depending on the application involved and the nature of any polymerisation catalyst which may be present. Generally temperatures in the range 100 to 300° C. are employed.

The following examples illustrate the preparation and properties of compositions according to the present invention, and their use in adhesive and in surface coating compositions.

EXAMPLE 1

An adhesive was prepared from the following components:

Parts by weight
Paste-forming grade polyvinyl chloride _____ 50
Diallyl phthalate _____ 30
t-Butyl perbenzoate _____ 0.3
Dibasic lead phthalate _____ 5

The composition was prepared by weighing out the ingredients, roughly mixing them and then passing the mixture through a triple roll mill three times. An example of a paste-forming grade of polyvinyl chloride which is available commercially is Breon*-121 (registered trademark) and a commercially available dibasic lead phthalate is Dythal (registered trademark).

Samples of sheet steel bonded with this adhesive and cured for 45 minutes at 145° C. gave bond strengths tested in shear of greater than 800 lbs./sq. in.

EXAMPLE 2

An adhesive was prepared from the following components:

Parts by weight
Paste-forming grade polyvinyl chloride _____ 50
A mixed pentaerythritol ester of butyric and caprylic acids _____ 15
Diallyl phthalate _____ 15
Whiting _____ 15
White lead (basic lead carbonate) _____ 5
Dibasic lead phthalate _____ 5
t-Butyl perbenzoate _____ 0.15

The composition was prepared as in Example 1. An example of a commercially available mixed pentaerythritol ester is Bisoflex PCB (trademark).

Samples of sheet steel bonded with this adhesive and cured for 45 minutes at 145° C. gave bond strengths, tested in shear, in excess of 800 lbs./sq. in. When aged for 3 hours at 170° C. the bond strength was still found to be in excess of 800 lbs./sq. in. There was little difference between the bond strengths achieved with steel which had been thoroughly cleaned and those achieved with a steel surface which had been deliberately smeared with oil, when using this adhesive composition.

EXAMPLE 3

A coating composition was prepared by efficiently dispersing in a ball mill, the following components:

Solid components

Parts by weight
Paste-forming grade polyvinyl chloride _____ 50
Rutile titanium dioxide _____ 10
White lead _____ 5
Dibasic lead phthalate _____ 5

Liquid components di-2-ethyl hexyl phthalate _____ 15
Xylene _____ 20
Toluene _____ 10

Just prior to its application by spraying or dipping, the following mixture was added and thoroughly mixed in:

Diallyl phthalate _____ 15 parts by weight.
t-Butyl perbenzoate _____ 0.15 parts by weight.
Xylene _____ quantity depending on dispersion viscosity required.

Good adhesion to steel was obtained when the steel was coated with the formulation and the coating was cured for 15–60 minutes at 150° C.

EXAMPLE 4

A powdered composition was prepared from the following components:

| | Parts by weight |
|---|---|
| Paste-forming grade polyvinyl chloride | 100 |
| A mixed phthalate of $C_7$–$C_9$ alcohols | 12.5 |
| Diallyl phthalate | 12.5 |
| t-Butyl perbenzoate | 0.25 |
| Rutile titanium dioxide | 10 |
| White lead | 5 |
| Dibasic lead phthalate | 5 |

An example of a mixed phthalate of $C_7$–$C_9$ alcohols which is commercially available is Bisoflex 791 (registered trademark).

Solvent degreased strip steel at 160° C. was sprinkled with the powdered composition, the coated strip was heated between platens at 170° C. and pressure of 20 lbs./sq. in. was applied to the coating for 3 minutes. A fused flexible coating of good adhesion to the steel was obtained.

A similar composition in which the white lead and dibasic lead phthalate were replaced by an organo-tin complex, when cured under identical conditions gave a coating with very poor adhesion to steel.

EXAMPLES 5–10

A range of adhesives was prepared as in Example 1 using various stabilisers in the following base formulation:

| | Parts by weight |
|---|---|
| Paste-forming grade polyvinyl chloride | 50 |
| A mixed phthalate of $C_7$–$C_9$ alcohols | 15 |
| Diallyl phthalate | 15 |
| Whiting | 5 |
| White lead | 5 |
| Stabiliser | 5 |
| t-Butyl perbenzoate | 0.15 |

Shear adhesive strengths obtained when bonding steel with these formulations are quoted in Table I.

TABLE I

| Example No. | Stabiliser | Curing conditions, °C., for 45 minutes | Adhesive strength, lbs./sq. in. |
|---|---|---|---|
| 5 | Basic lead acetate | 135 | 680 |
|   |                    | 170 | 870 |
| 6 | Lead naphthenate   | 135 | 350 |
|   |                    | 170 | 510 |
| 7 | Dibasic lead phthalate | 135 | 1900 |
|   |                        | 170 | 2480 |
| 8 | Dibasic lead phosphite | 135 | 1590 |
|   |                        | 170 | 2000 |
| 9 | Tribasic lead sulphate | 135 | 1680 |
|   |                        | 170 | 2210 |
| 10 | Tribasic lead maleate | 135 | 440 |
|    |                       | 170 | 1700 |

EXAMPLES 11 AND 12

Two adhesive formulations were prepared as in Example 1 and according to the formulation:

| | Parts by weight |
|---|---|
| Paste-forming grade polyvinyl chloride | 50 |
| A mixed pentaerythritol ester of butyric and caprylic acids | 15 |
| Polymerisable plasticiser | 15 |
| Whiting | 15 |
| White lead | 5 |
| Dibasic lead phthalate | 5 |
| t-Butyl perbenzoate | 0.15 |

The polymerisable plasticisers used were, Example 11, diallyl phthalate, Example 12, a 1:2 blend of the multiple maleate ester previously mentioned and diallyl phthalate. The shear adhesive strength to aluminium was measured using a cure time of 45 minutes at 135° C. Results are shown in Table II.

TABLE II

| Example No. | Polymerisable plasticisers | Adhesive strength, lbs./sq. in. |
|---|---|---|
| 11 | Diallyl phthalate | 900 |
| 12 | 1:2 multiple maleate:diallyl phthalate | 1,540 |

EXAMPLE 13

An organosol composition was prepared from the following formulation:

| | Parts by weight |
|---|---|
| Paste-forming grade polyvinyl chloride | 100 |
| A mixed phthalate of $C_7$–$C_9$ alcohols | 40 |
| A low molecular weight polymer of diallyl phthalate | 40 |
| Titanium dioxide | 20 |
| Dibasic lead phthalate | 3 |
| t-Butyl perbenzoate | 0.8 |
| Xylene/toluene (2:1) | 90 |

An example of a commercially available low molecular weight polymer of diallyl phthalate is Dapon (registered trademark), which polymer has a softening range of 80°–105° C.

Films produced from this material, when cured for 30 minutes at 160° C., had excellent adhesion to mild steel and were extremely tough.

We claim:

1. A vinyl polymer composition which comprises a resin component consisting essentially of 15 to 85% by weight of a vinyl chloride polymer, from about 0.01 to about 40 parts by weight of a stabilizer selected from the group consisting of basic lead carbonate, di-basic lead phosphate and tri-basic lead sulphite and a lead salt of an organic acid containing less than 10 carbon atoms per molecule, a chemical polymerisation catalyst which functions as a free radical initiator, and as the sole polymerisable organic compound present in the composition, a compound selected from the group consisting of triethylene glycol bis(allyl carbonate), triallyl phosphate, triallyl cyanurate, diallyl phthalate, allyl acrylate and a mutiple ester of maleic acid obtained by reacting together 3 molar proportions of maleic acid, 2 molar proportions of ethylene glycol and 2 molar proportions of allyl alcohol said polymerisable organic compound being present in an amount of 0.1 to 80% by weight of the composition.

2. A vinyl polymer composition as claimed in claim 1 wherein the polymerisable organic compound is a low molecular weight polymer of diallyl phthalate.

3. A vinyl polymer composition as claimed in claim 1 wherein the polymerisation catalyst is selected from the group consisting of benzoyl peroxide and di-tertiary butyl perbenzoate.

4. A vinyl polymer composition as claimed in claim 1 which additionally contains up to 50% by weight of a non-polymerisable plasticiser.

5. A vinyl polymer composition as claimed in claim 1 wherein the stabiliser is a lead salt of an organic acid selected from the group consisting of lead acetate, basic lead acetate, dibasic lead phthalate, and tribasic lead maleate monohydrate.

References Cited

UNITED STATES PATENTS

| 3,376,246 | 4/1968 | Valentine et al. | 260—31.6 |
| 2,567,719 | 9/1951 | Loritsch et al. | 260—31.8 |
| 2,618,621 | 11/1952 | Burt | 260—31.4 |
| 2,754,281 | 7/1956 | Kuder | 260—31.2 |
| 3,066,110 | 11/1962 | Cornell | 260—30.4 |
| 3,149,087 | 9/1964 | Anagnostopoulos | 260—31.6 |
| 3,230,131 | 1/1966 | McFarland | 156—332 |

DONALD E. CZAJA, *Primary Examiner.*

R. A. WHITE, *Assistant Examiner.*

UNITED STATES PATENT OFFICE
CERTIFICATE OF CORRECTION

Patent No. 3,414,534          Dated December 3, 1968

Inventor(s) JOHN JACKSON HUITSON ET AL.

It is certified that error appears in the above-identified patent and that said Letters Patent are hereby corrected as shown below:

In claim 1, line 6, change "di-basic lead phosphate and tri-basic lead sulphite" to read --di-basic lead phosphite and tri-basic lead sulphate---.

Signed and sealed this 11th day of January 1972.

(SEAL)
Attest:

EDWARD M. FLETCHER, JR.        ROBERT GOTTSCHALK
Attesting Officer               Acting Commissioner of Patent